United States Patent [19]

Agano

[11] Patent Number: 4,582,989

[45] Date of Patent: Apr. 15, 1986

[54] IMAGE SCANNING READ-OUT APPARATUS

[75] Inventor: Toshitaka Agano, Kanagawa, Japan

[73] Assignee: Fuji Photo Film Co., Ltd., Kanagawa, Japan

[21] Appl. No.: 622,378

[22] Filed: Jun. 20, 1984

[30] Foreign Application Priority Data

Jun. 24, 1983 [JP] Japan .................................. 58-113675
Jun. 27, 1983 [JP] Japan .................................. 58-115471

[51] Int. Cl.⁴ ............................................... G03C 5/16
[52] U.S. Cl. .................... 250/327.2; 250/347; 250/351
[58] Field of Search ............... 250/327.2, 484.1, 351, 250/347, 235, 350; 350/6.6; 346/109; 358/208, 293

[56] References Cited

U.S. PATENT DOCUMENTS 4,307,930 12/1981 Saito ..................................... 350/6.6
4,484,073 11/1984 Ohara et al. ........................ 250/347

Primary Examiner—Alfred E. Smith
Assistant Examiner—Carolyn E. Fields
Attorney, Agent, or Firm—Sughrue, Mion, Zinn, Macpeak and Seas

[57] ABSTRACT

An apparatus for reading out an image by scanning comprises a stimulating ray source, a device for scanning a stimulable phosphor sheet carrying an image stored therein by stimulating rays forwardly and backwardly in a main scanning direction, a device for scanning the stimulable phosphor sheet by the stimulating rays in a sub-scanning direction normal to the main scanning direction, and a read-out device for detecting light emitted by the stimulable phosphor sheet when it is exposed to stimulating rays. A converging lens is positioned to converge the stimulating rays, and a light shielding member is positioned at the converging point to intercept the stimulating rays during the backward scanning period. Or, an acousto-optic modulator is positioned between the stimulating ray source and the converging lens to diffract the stimulating rays and generate diffracted light components other than a zero-order diffracted light component during the backward scanning period. A light shielding plate having a pinhole for passing only the zero-order diffracted light component is positioned at the converging point.

7 Claims, 8 Drawing Figures

IMAGE SCANNING READ-OUT APPARATUS

BACKGROUND OF THE INVENTION

1. Field of the Invention

This invention relates to an apparatus for reading out an image stored in a stimulable phosphor sheet by two-dimensionally scanning the stimulable phosphor sheet by stimulating rays. This invention particularly relates to an apparatus for reading out an image by scanning wherein backward scan lines, i.e. return scan lines, in forward and backward scanning in the main scanning direction are erased.

2. Description of the Prior Art

When certain kinds of phosphors are exposed to a radiation such as X-rays, α-rays, β-rays, γ-rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet or simply as a sheet) is first exposed to a radiation passing through an object to have a radiation image stored therein, and is then scanned with stimulating rays such as a laser beam which cause it to emit light in the pattern of the stored image. The light emitted from the stimulable phosphor sheet upon stimulation thereof is photoelectrically detected and converted to an electric image signal, which is processed as desired to reproduce a visible image on a recording medium such as a photographic light-sensitive material or on a display device such as a cathode ray tube (CRT).

In an apparatus for reading out an image by scanning in the aforesaid radiation image recording and reproducing system, the stimulable phosphor sheet carrying a radiation image stored therein is two-dimensionally scanned by stimulating rays such as a laser beam, and light emitted by the stimulable phosphor sheet is sequentially detected and converted into electric image signals by a photodetector such as a photomultiplier. The two-dimensional scanning is conducted by scanning the stimulable phosphor sheet by stimulating rays in the main scanning direction and in the sub-scanning direction. For this purpose, in general, the stimulable phosphor sheet is moved in the sub-scanning direction and, at the same time, the stimulating rays are moved forwardly and backwardly in the main scanning direction normal to the moving direction of the sheet.

As a means for conducting the scanning in the main scanning direction, a galvanometer mirror moveable forwardly and backwardly at a predetermined speed along a predetermined path is generally used. In this case, since the stimulable phosphor sheet is continuously moved at a predetermined speed in the sub-scanning direction, the scan lines traced on the sheet by the stimulating rays moved forwardly and backwardly in the main scanning direction by the main scanning means zigzag at a predetermined angle with respect to the direction normal to the sub-scanning direction. Since the beam of stimulating rays has a predetermined diameter, the scan lines overlap at portions where the scanning direction is changed over from the forward scanning direction to the backward scanning direction and vice versa. Particularly when the scan line density is increased to conduct image read-out at a high accuracy, the forward scan lines and the backward scan lines become closer to each other and, therefore, the areas of the overlapping portions of the scan lines increase. When the stimulable phosphor sheet is once exposed to stimulating rays to emit light in proportion to the radiation energy stored therein, the level of the radiation energy stored decreases. Therefore, when overlapping of the scan lines arises as described above during image read-out, the problem that the portions of the stimulable phosphor sheet previously exposed to stimulating rays to release the stored radiation energy as light emission and now having a decreased level of residual radiation energy stored therein are again exposed to stimulating rays for image read-out arises in the overlapping portions of the scan lines. As a result, the electric image signals obtained by scanning the stimulable phosphor sheet by stimulating rays in this manner become incorrect.

SUMMARY OF THE INVENTION

The primary object of the present invention is to provide an apparatus for reading out an image by scanning, which correctly reads out the image by eliminating the overlapping of forward and backward scan lines in the main scanning direction.

Another object of the present invention is to provide an apparatus for reading out an image by scanning, which quickly and correctly reads out the image by eliminating the overlapping of forward and backward scan lines in the main scanning direction.

The present invention provides an apparatus for reading out an image by scanning, which is provided with a stimulating ray source for emitting a light beam, a main scanning means for scanning a stimulable phosphor sheet carrying an image stored therein by said light beam forwardly and backwardly in a main scanning direction, a sub-scanning means for scanning said stimulable phosphor sheet by said light beam in a sub-scanning direction approximately normal to said main scanning direction, and a read-out means for photoelectrically detecting light emitted by said stimulable phosphor sheet in the pattern of the stored image when said stimulable phosphor sheet is scanned by said light beam, wherein the improvement comprises the provisions of a converging means positioned in the optical path of said light beam for converging said light beam at a point on said optical path, and a light shielding means for intercepting the passage of said light beam at the converging position of said light beam converged by said converging means during the period of backward scanning in said main scanning direction in synchronization with said forward and backward scanning in said main scanning direction.

As the converging means of the apparatus for reading out an image by scanning in accordance with the present invention, it is possible to use, for example, a pair of convex lenses. As the driving section of the light shielding means, any device may be used insofar as a light shielding member of the light shielding means is moved in synchronization with the forward and backward scanning of the light beam in the main scanning direction conducted by the main scanning means so as to intercept the passage of the light beam during the backward scanning period. Thus the driving section may be of the type rotating the light shielding member forwardly and backwardly, or rotating it in a single direction, or linearly moving it forwardly and backwardly.

In the apparatus for reading out an image by scanning in accordance with the present invention, since the light shielding means for moving in synchronization with the forward and backward scanning in the main scanning direction conducted by the main scanning means and intercepting the passage of the light beam during the backward scanning period is installed at the converging position of the light beam, the stimulable phosphor sheet can be prevented from being exposed to the light beam during the backward scanning period. Therefore, the level of the image information stored in the stimulable phosphor sheet is not decreased by the light beam scanning along backward scan lines, and it becomes possible to correctly read out the image stored in the stimulable phosphor sheet. Further, since the interception of the light beam is conducted at the position where the light beam is converged to a small beam diameter, deflection of the light shielding member of the light shielding means necessary for achieving the light shielding may be very small, and the size of the light shielding member can be minimized. Accordingly, it is possible to increase the speed of rotation or forward-backward movement of the light shielding member conducted by the driving section of the light shielding means. As a result, it becomes possible to conduct image read-out at a high speed.

The present invention also provides an apparatus for reading out an image by scanning, which is provided with a stimulating ray source for emitting a light beam, a main scanning means for scanning a stimulable phosphor sheet carrying an image stored therein by said light beam forwardly and backwardly in a main scanning direction, a sub-scanning means for scanning said stimulable phosphor sheet by said light beam in a sub-scanning direction approximately normal to said main scanning direction, and a read-out means for photoelectrically detecting light emitted by said stimulable phosphor sheet in the pattern of the stored image when said stimulable phosphor sheet is scanned by said light beam, wherein the improvement comprises the provision of a converging means positioned in the optical path of said light beam for converging said light beam at a point on said optical path, an acousto-optic modulator positioned in said optical path between said converging means and said stimulating ray source for diffracting said light beam and generating diffracted light components other than a zero-order diffracted light component during the period of backward scanning in said main scanning direction in synchronization with said forward and backward scanning in said main scanning direction, and a light shielding plate positioned at the converging position of said light beam converged by said converging means and having a pinhole for passing therethrough only the zero-order diffracted light component coming from said acousto-optic modulator.

By "diffracted light components other than a zero-order diffracted light component" is meant high-order diffracted light components such as first-order, second-order, minus first-order, and minus second-order diffracted light components. By "acousto-optic modulator" is meant a light modulator utilizing acousto-optic effects, which modulates light by modulating an ultrasonic input by utilizing the Debye-Sears effect or the effect that the intensity of the first-order diffracted light component in Bragg diffraction is approximately proportional to the ultrasonic input. Therefore, the acousto-optic modulator is advantageous in that, though the modulation band width is approximately several tens of megahertz, the extinction ratio can be made very small and the operation stability against a change in temperature is good.

In the apparatus of the present invention mentioned last, the light shielding plate having a pinhole for passing only the zero-order diffracted light component therethrough is positioned at the converging position of the light beam converged by the converging means. Since the diffracted light components coming from the acousto-optic modulator are very close to each other, it becomes difficult to intercept only the diffracted light components other than the zero-order diffracted light component unless the interception is conducted at the position where the diameter of the light beam, i.e. the zero-order diffracted light component, is small.

In the apparatus of the present invention mentioned last, the acousto-optic modulator is positioned in the optical path between the stimulating ray source and the light beam converging means, and modulation by the acousto-optic modulator is carried out in synchronization with the forward and backward scanning in the main scanning direction conducted by the main scanning means. Thus the light beam emitted by the stimulating ray source is diffracted by the acousto-optic modulator to generate diffracted light components of first order and higher or minus first order and lower only during the backward scanning period. Further, the light shielding plate having a pinhole for passing therethrough only the zero-order diffracted light component used for stimulating the stimulable phosphor sheet is installed at the converging position of the light beam converged by the converging means. In this manner, the diffracted light components other than the zero-order diffracted light component which are generated during the backward scanning period are intercepted by the light shielding plate. Therefore, the apparatus exhibits a very high response speed (several tens of thousands times the speed of a backward scan line erasing apparatus using a mechanical light shielding means), and can simply realize high-speed image read-out by scanning. That is, even when image read-out is conducted at a high speed, it is possible to prevent the stimulable phosphor sheet from being exposed to stimulating rays during the backward scanning period, and to correctly read out the image stored in the stimulable phosphor sheet since the level of the image information stored in the sheet is not decreased by stimulating rays scanning along backward scan lines. Further, the acousto-optic modulator can accurately and quickly control the modulation with respect to fluctuation in light beam output of the stimulating ray source and, therefore, is advantageous also as a means for stabilizing the light amount. Also, the apparatus is very reliable since no moving section is used therein. Accordingly, the apparatus using the acousto-optic modulator in accordance with the present invention is very advantageous in practical use.

DESCRIPTION OF THE PREFERRED EMBODIMENTS

The present invention will hereinbelow be described in further detail with reference to the accompanying drawings.

Figure 1:
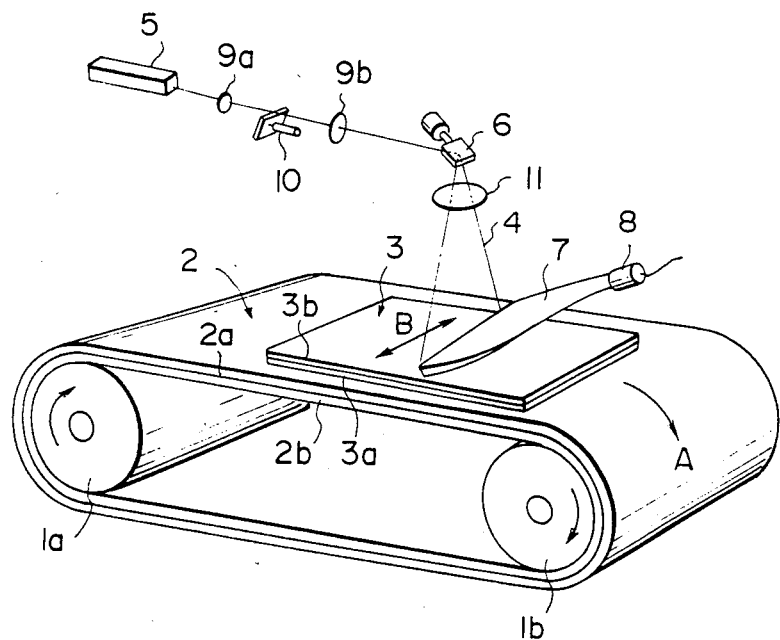
FIG. 1 is a schematic view showing an embodiment of the apparatus for reading out an image by scanning in accordance with the present invention.

Referring to FIG. 1, an endless belt 2 provided with a magnet layer 2a overlaid on the surface is driveably positioned around a pair of rollers 1a and 1b. A stimulable phosphor sheet 3 is closely contacted with the magnet layer 2a of the endless belt 2 by magnetic attraction. The rollers 1a and 1b are rotated to move the endless belt 2 in the direction as indicated by the arrow A. While the stimulable phosphor sheet 3 is moved together with the endless belt 2 in the direction as indicated by the arrow A, a laser beam 4 emitted from a laser beam source 5 is made to impinge upon the stimulable phosphor sheet 3 via a galvanometer mirror 6 so as to scan the sheet 3 in the direction as indicated by the arrow B normal to the moving direction A of the endless belt 2. As a result, the stimulable phosphor sheet 3 is two-dimensionally scanned by the laser beam 4. That is, the stimulable phosphor sheet 3 is scanned in the sub-scanning direction as indicated by the arrow A by the sub-scanning means comprising a pair of rollers 1a and 1b and the endless belt 2, and in the main scanning direction as indicated by the arrow B normal to the sub-scanning direction by the galvanometer mirror 6 acting as the main scanning means. The endless belt 2 comprises a flexible endless belt substrate 2b and the magnet layer 2a overlaid on the substrate 2b.

A beam expander comprising convex lenses 9a and 9b and acting as a beam converging means is positioned in the optical path between the laser beam source 5 and the galvanometer mirror 6. At the beam converging position between the beam expander lenses 9a and 9b is positioned a rotatable light shielding means 10 for intercepting the laser beam 4 during the backward scanning period in synchronization with the forward and backward scanning in the main scanning direction conducted by the galvanometer mirror 6.

The purpose of expanding the laser beam 4 by the beam expander lenses 9a and 9b is to minimize the size of the light spot ultimately formed on the stimulable phosphor sheet 3. The laser beam 4 expanded by the beam expander lenses 9a and 9b is converged by an image forming lens 11 onto the stimulable phosphor sheet 3.

The stimulable phosphor sheet 3 comprises a magnetic material layer 3a and a stimulable phosphor layer 3b laid on the magnetic material layer 3a. The stimulable phosphor layer 3b carries a radiation transmission image of an object stored therein. When the laser beam 4 impinges upon the stimulable phosphor sheet 3, the portion of the sheet 3 exposed to the laser beam 4 emits light in proportion to the radiation energy stored. The emitted light enters a light guide member 7 fabricated, for example, by forming an acrylic plate, and is guided inside of the light guide member 7 by total reflection to a photodetector 8 such as a photomultiplier, which detects and converts the light into electric image signals. Thus the electric image signals are sequentially obtained as the stimulable phosphor sheet 3 is two-dimensionally scanned by the laser beam 4 and then processed and used for reproducing the image.

Figure 2:
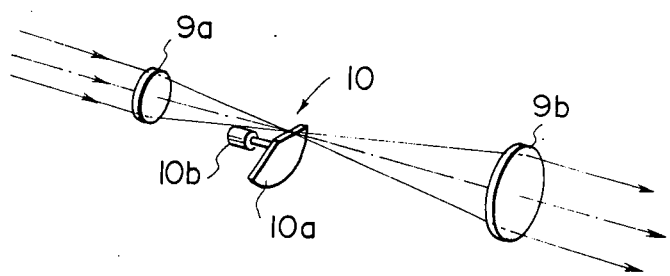
FIG. 2 is an enlarged schematic view showing the beam expander and the light shielding means of the apparatus of FIG. 1.
Figure 2A:
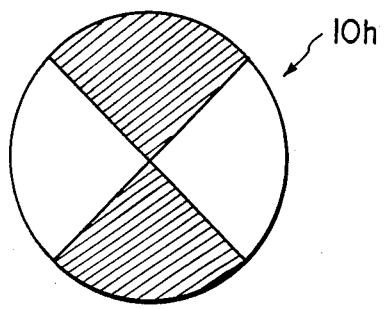
FIG. 2A is a schematic view showing a modified form of the sector employed in the light shielding means of FIG. 2, FIGS. 3A and 3B are respectively a perspective view and a schematic view showing another embodiment of the light shielding means.

FIG. 2 is an enlarged schematic view showing the rotatable light shielding means 10 and the beam expander lenses 9a and 9b of FIG. 1. The laser beam impinging upon the first lens 9a of the beam expander is converged thereby and then diverges. The beam diameter of the laser beam is then expanded by the second lens 9b. At the converging position of the laser beam between the beam expander lenses 9a and 9b is positioned a sector 10a provided with a rotation shaft approximately parallel to the laser beam and rotated by a rotating motor 10b in synchronization with the forward and backward scanning in the main scanning direction conducted by the galvanometer mirror 6. The sector 10a is constituted by a fan-like light shielding member, and the rotation timing and the angle at the circumference of the sector 10a are adjusted to intercept the laser beam only during the backward scanning period in accordance with a synchronizing signal sent from the galvanometer mirror 6. In the embodiment of FIG. 2, since the sector 10a is installed at the beam converging position, it is possible to minimize the size of the sector 10a. Further, since interception of the laser beam can be achieved simply by rotating the sector 10a in a single direction by the rotating motor 10b, the interception of the laser beam can be conducted easily in conformity with the high speed scanning by the galvanometer mirror 6. As a modified form of the sector 10a, FIG. 2A shows a disk 10h which is advantageous in that it does not generate wind during rotation. The disk 10h is fabricated of a transparent glass plate or a transparent acrylic plate and provided with two light shielding portions on which a light shielding member is applied to intercept the laser beam during the backward scanning period. In this embodiment, the light shielding portions and portions permeable to light are alternately positioned at approximately 90° intervals on the disk 10h, and the rotation of the disk 10h is timed so that the light shielding portions intercept the passage of the laser beam only during the backward scanning period on the basis of the synchronizing signal sent from the galvanometer mirror 6.

However, in FIG. 2A, the angle ratio of the light shielding portions to the portions permeable to light or the numbers of the respective portions may be changed when necessary.

Figure 3A:
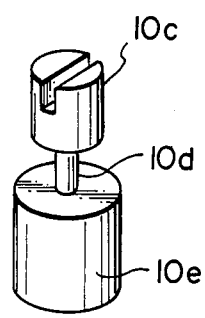
Figure 3B:
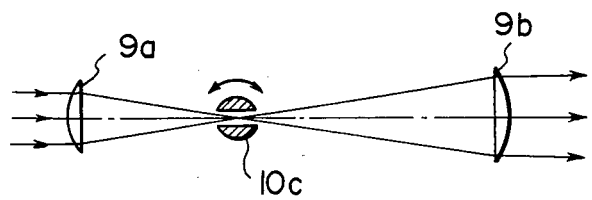

FIG. 3A is a perspective view showing another embodiment of the light shielding means of the apparatus for reading out an image by scanning in accordance with the present invention, and FIG. 3B is a schematic view showing the light shielding means of FIG. 3A positioned in the optical path of the laser beam. In this embodiment, a light shielding member 10c is secured to a rotation shaft 10d of a galvanometer 10e. The rotation shaft 10d is positioned approximately normal to the laser beam, and the light shielding member 10c is rotated forwardly and backwardly by the galvanometer 10e. The light shielding member 10c consists of a cylindrical light shielding material having a through groove laterally extending in the upper surface, and is installed at the beam converging position between the beam expander lenses 9a and 9b. The galvanometer 10e is rotated forwardly and backwardly in synchronization with the forward and backward scanning in the main scanning direction conducted by the galvanometer mirror 6. That is, the galvanometer 10e rotates the light shielding member 10c forwardly and backwardly so that the laser beam passes through the groove of the light shielding member 10c during the forward scanning period and is intercepted by the wall portions on both sides of the groove during the backward scanning period. In this embodiment, since the light shielding member 10c is installed at the beam converging position, it is possible to minimize the size of the light shielding member 10c. Further, since the wall portions on both sides of the groove are used to intercept the laser beam, interception of the laser beam can be achieved by a smaller rotation angle of the light shielding member 10c than when only a single side wall portion is used, and can be conducted in conformity with the high speed scanning by the galvanometer mirror 6.

Figure 4:
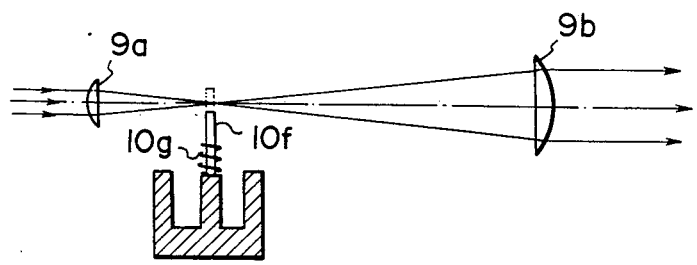
FIG. 4 is a schematic view showing a further embodiment of the light shielding means.

FIG. 4 is a schematic view showing a further embodiment of the light shielding means of the apparatus for reading out an image by scanning in accordance with the present invention. In this embodiment, a piston type light shielding member 10f consisting of a metal plate is installed approximately normal to the laser beam at the beam converging position between the beam expander lenses 9a and 9b. A solenoid 10g is positioned below the light shielding member 10f to vertically move the light shielding member 10f in synchronization with the forward and backward scanning in the main scanning direction conducted by the galvanometer mirror 6. Namely, the light shielding member 10f is moved vertically so that it is positioned below the laser beam to pass the laser beam during the forward scanning period and raised to intercept the laser beam during the backward scanning period. In this embodiment, since the light shielding member 10f is installed at the beam converging position and the moving distance of the light shielding member 10f may be very small, interception of the laser beam can be conducted in conformity with the high speed scanning by the galvanometer mirror 6.

Figure 5:
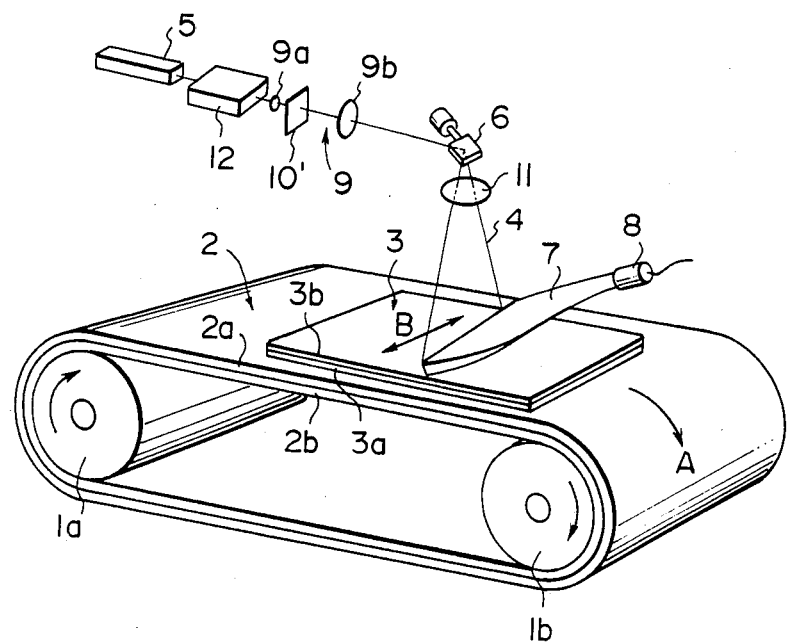
FIG. 5 is a schematic view showing another embodiment of the apparatus for reading out an image by scanning in accordance with the present invention.
Figure 6:
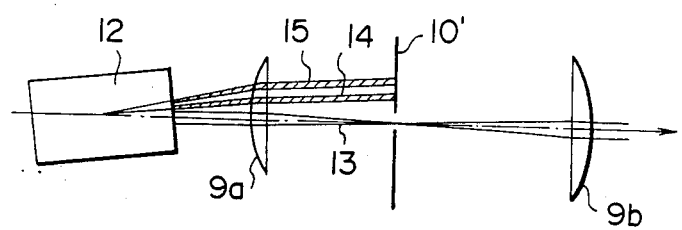
FIG. 6 is an enlarged schematic view showing a part of the apparatus of FIG. 5.

FIG. 5 shows another embodiment of the apparatus for reading out an image by scanning in accordance with the present invention. In FIG. 5, similar elements are numbered with the same reference numerals with respect to FIG. 1. In this embodiment, an acousto-optic modulator 12 is positioned at the stage next to the laser beam source 5 in the optical path of the laser beam 4 emitted from the laser beam source 5. Between the acousto-optic modulator 12 and the galvanometer mirror 6 is positioned a light beam converging means 9 comprising a pair of convex lenses 9a and 9b. As shown in FIG. 6, there is installed at the beam converging position of the light beam converging means 9 a light shielding plate 10' having a pinhole for passing therethrough only the zero-order diffracted light component coming from the acousto-optic modulator 12.

The acousto-optic modulator 12 is controlled in synchronization with the forward and backward scanning in the main scanning direction conducted by the galvanometer mirror 6 so as to modulate the laser beam 4 emitted by the laser beam source 5 only during the backward scanning period and not to modulate the laser beam during the forward scanning period.

That is, when the stimulable phosphor sheet 3 is scanned by the laser beam 4 along the forward scan lines, the acousto-optic modulator 12 does not modulate the laser beam, and most of the laser beam 4 impinging upon the modulator 12 (approximately 97% to 98% thereof) is passed through the modulator 12 as the zero-order diffracted light component.

The zero-order diffracted light component passing through the acousto-optic modulator 12 is converged by the first convex lens 9a of the beam converging means 9 and passed through the pinhole of the light shielding plate 10' installed at the converging position. The zero-order diffracted light component is then converted by the second convex lens 9b into parallel rays of light and made to impinge upon the galvanometer mirror 6.

During the backward scanning period, the acousto-optic modulator 12 diffracts the laser beam at the maximum modulation efficiency and converts most (90% to 95%) of the light amount of the laser beam impinging upon the modulator 12 into the diffracted light components other than the zero-order diffracted light component. At this time, a portion within the range of approximately 5% to 10% of the light amount of the laser beam impinging upon the modulator 12 remains as the zero-order diffracted light component. The diffracted light components other than the zero-order diffracted light component are intercepted by the light shielding plate 10', and the zero-order diffracted light component is passed through the pinhole of the light shielding plate 10'.

As shown in the enlarged view in FIG. 6 showing the acousto-optic modulator 12, the light beam converging means 9, and the light shielding plate 10', the diffracted light components other than the zero-order diffracted light component, e.g. a first-order diffracted light component 14 and a second-order diffracted light component 15, which are generated by the diffraction by the acousto-optic modulator 12 during the backward scanning period are intercepted by the light shielding plate 10' installed at the light beam converging position. In this case, a zero-order diffracted light component exists in an amount within the range of approximately 5% to 10% of the light amount of the laser beam impinging upon the acousto-optic modulator 12. This is caused by the general characteristics of the acousto-optic modulator 12. However, practically, no adverse effect arises when the zero-order diffracted light component in the small amount as described above impinges upon the stimulable phosphor sheet 3. Further, when scanning in the main scanning direction is conducted, backward scanning is generally conducted at a speed higher than the speed of the forward scanning. Therefore, the energy of the zero-order diffracted light component impinging upon the stimulable phosphor sheet 3 during the backward scanning further decreases.

I claim:

1. An apparatus for reading out an image by scanning, which is provided with a stimulating ray source for emitting a light beam, a main scanning means for scanning a stimulable phosphor sheet carrying an image stored therein by said light beam forwardly and backwardly in a main scanning direction, a sub-scanning means for scanning said stimulable phosphor sheet by said light beam in a sub-scanning direction approximately normal to said main scanning direction, and a read-out means for photoelectrically detecting light emitted by said stimulable phosphor sheet in the pattern of the stored image when said stimulable phosphor sheet is scanned by said light beam, wherein the improvement comprises the provision of a converging means positioned in the optical path of said light beam for converging said light beam at a point in said optical path, and a light shielding means for intercepting the passage of said light beam at the converging position of said light beam converged by said converging means during the period of backward scanning in said main scanning direction in synchronization with said forward and backward scanning in said main scanning direction.

2. An apparatus as defined in claim 1 wherein said light shielding means comprises a sector having a rotation shaft approximately parallel to said light beam for rotation in synchronization with said forward and backward scanning in said main scanning direction, and having a light shielding portion for intercepting the passage of said light beam during said period of backward scanning in said main scanning direction.

3. An apparatus as defined in claim 1 wherein said light shielding means is a galvanometer light shielding means comprising a rotation shaft approximately normal to said light beam, and a light shielding member having a groove portion provided with a pair of side walls standing face to face to each other, said light shielding member being secured to an end of said rotation shaft for forward and backward rotation in synchronization with said forward and backward scanning in said main scanning direction, whereby said light beam is passed between said side walls of said groove portion during the period of forward scanning in said main scanning direction and intercepted by said side walls of said groove portion during said period of backward scanning in said main scanning direction.

4. An apparatus as defined in claim 1 wherein said light shielding means is a piston type light shielding means having a plate-like light shielding member positioned in a direction approximately normal to said light beam for reciprocation in synchronization with said forward and backward scanning in said main scanning direction, said piston type light shielding means being positioned so that said light shielding member intercepts the passage of said light beam during said period of backward scanning in said main scanning direction.

5. An apparatus as defined in claims 1, 2, 3 or 4 wherein said converging means comprises a pair of convex lenses acting as a beam expander, and said light shielding means is positioned at said converging position of said light beam between said convex lenses.

6. An apparatus for reading out an image by scanning, which is provided with a stimulating ray source for emitting a light beam, a main scanning means for scanning a stimulable phosphor sheet carrying an image stored therein by said light beam forwardly and backwardly in a main scanning direction, a sub-scanning means for scanning said stimulable phosphor sheet by said light beam in a sub-scanning direction approximately normal to said main scanning direction, and a read-out means for photoelectrically detecting light emitted by said stimulable phosphor sheet in the pattern of the stored image when said stimulable phosphor sheet is scanned by said light beam, wherein the improvement comprises the provision of a converging means positioned in the optical path of said light beam for converging said light beam at a point in said optical path, an acousto-optic modulator positioned in said optical path between said converging means and said stimulating ray source for diffracting said light beam and generating diffracted light components other than a zero-order diffracted light component during the period of backward scanning in said main scanning direction in synchronization with said forward and backward scanning in said main scanning direction, and a light shielding plate positioned at the converging position of said light beam converged by said converging means and having a pinhole for passing therethrough only the zero-order diffracted light component coming from said acousto-optic modulator.

7. An apparatus as defined in claim 6 wherein said converging means comprises a pair of convex lenses acting as a beam expander, and said light shielding plate is positioned at said converging position of said light beam between said convex lenses.

* * * * *